United States Patent
Dominic et al.

(10) Patent No.: US 9,776,501 B2
(45) Date of Patent: Oct. 3, 2017

(54) PROTECTION OF VEHICLE FLUID CONDUITS

(71) Applicants: Toyota Motor Engineering & Manufacturing North America, Inc., Erlanger, KY (US); Toyota Jidosha Kabushiki Kaisha, Toyota-shi, Aichi-ken (JP)

(72) Inventors: Justin E. Dominic, Milan, MI (US); Nobuhiro Nakano, Toyota (JP); Hiroki Ogasawara, Ann Arbor, MI (US)

(73) Assignees: Toyota Motor Engineering & Manufacturing North America, Inc., Erlanger, KY (US); Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 326 days.

(21) Appl. No.: 14/624,741

(22) Filed: Feb. 18, 2015

(65) Prior Publication Data

US 2016/0236564 A1    Aug. 18, 2016

(51) Int. Cl.
*B60K 15/01*    (2006.01)
*F16L 57/00*    (2006.01)
*B60K 15/035*    (2006.01)

(52) U.S. Cl.
CPC ............ *B60K 15/01* (2013.01); *B60K 15/035* (2013.01); *F16L 57/00* (2013.01); *B60K 2015/03528* (2013.01); *B60K 2015/03538* (2013.01)

(58) Field of Classification Search
CPC ............ B60K 15/04; B60K 2015/0474; B60K 15/01; B60K 15/035
See application file for complete search history.

(56) References Cited

U.S. PATENT DOCUMENTS

| | | | | |
|---|---|---|---|---|
| 4,550,923 A | * | 11/1985 | Ogawa | B60K 15/04 137/354 |
| 5,996,622 A | * | 12/1999 | Cimminelli | B60K 15/035 137/587 |
| 6,051,291 A | * | 4/2000 | Gladfelter | B60T 17/18 138/133 |
| 6,089,513 A | * | 7/2000 | Cau | B60K 15/01 248/68.1 |
| 6,880,593 B1 | * | 4/2005 | Swane | B29C 66/73921 141/286 |
| 7,021,343 B2 | * | 4/2006 | Okada | F16L 58/08 141/286 |
| 7,367,101 B2 | | 5/2008 | Takahashi et al. | |
| 7,422,242 B2 | | 9/2008 | Matsumoto et al. | |

(Continued)

FOREIGN PATENT DOCUMENTS

JP    4231008 B2    2/2009

*Primary Examiner* — Bradley Duckworth
(74) *Attorney, Agent, or Firm* — Christopher G. Darrow; Darrow Mustafa PC

(57) ABSTRACT

Vehicle fluid conduit systems and protectors for such systems are presented. Fluid conduit systems can include a fuel fill system having a fuel filler tube, a re-circulation tube, and a protector. In some embodiments, the protector can include a protector bracket and a bolting plate that extend around the fuel filler tube and re-circulation tube. The protector can include a strap. The strap can extend between the fuel filler tube and re-circulation tube between two or more protector attachment locations.

18 Claims, 4 Drawing Sheets

(56) References Cited

U.S. PATENT DOCUMENTS

| | | | |
|---|---|---|---|
| 7,594,583 B2 | 9/2009 | Whipple | |
| 8,020,718 B2 * | 9/2011 | Jung | B60K 15/04 141/286 |
| 8,627,912 B2 * | 1/2014 | Mulanon | B60K 15/03006 141/331 |
| 9,150,098 B2 * | 10/2015 | Fujiwara | B60K 15/01 |
| 2013/0320155 A1 * | 12/2013 | Okabe | B60K 15/01 248/65 |
| 2014/0103039 A1 | 4/2014 | Fujiwara et al. | |
| 2015/0239340 A1 * | 8/2015 | Kito | B60K 15/0406 220/86.1 |
| 2015/0274008 A1 * | 10/2015 | Kito | B60K 15/04 141/311 R |
| 2015/0352948 A1 * | 12/2015 | Kito | B60K 15/05 220/86.1 |
| 2015/0360727 A1 * | 12/2015 | Miwa | B60K 15/01 280/124.109 |

* cited by examiner

PROTECTION OF VEHICLE FLUID CONDUITS

FIELD

The present disclosure relates in general to fluid conduits for vehicles, and, more particularly, to the protection of fluid conduits for vehicles.

BACKGROUND

Modern vehicles, such as passenger and commercial vehicles, have various systems in which fluid conduits are used to facilitate the movement of a fluid from one location to another. Such vehicles include a fuel fill system. The fuel fill system allows fuel to be introduced to an onboard fuel storage tank. The fuel fill system can include a fuel filler tube to convey fuel from a fuel filler inlet to a fuel storage tank. The fuel fill system can also include a re-circulation tube to prevent the buildup of fuel vapors in certain areas. The re-circulation tube can fluidly connect the fuel storage unit to a portion of the fuel filler tube. The fuel filler tube and the re-circulation tube can be subjected to various forces resulting from collisions, accidents, or impacts to the area of the vehicle near the fuel filler system.

SUMMARY

In one respect, the present disclosure is directed to a fuel fill system for a vehicle. The fuel fill system can include a fuel filler tube configured to allow the transfer of fuel into a vehicle fuel storage tank. The fuel fill system can include a re-circulation tube. The re-circulation tube can be included in fluid communication with the fuel filler tube. The system can also include a protector. The protector can include a protector bracket having a plurality of attachment tabs, a bolting plate having a plurality of attachment tabs, and a strap having a plurality of attachment tabs. The attachment tabs of the strap can be positioned between the attachment tabs of the protector bracket and the attachment tabs of the bolting plate. The strap can be configured to extend between the fuel filler tube and the re-circulation tube.

In another respect, the present disclosure is directed to a protector for a vehicle fluid conduit system. The protector can include a protector bracket having a plurality of attachment tabs, a bolting plate having a plurality of attachment tabs, and a strap having a plurality of attachment tabs. The attachment tabs of the strap can be positioned between the attachment tabs of the protector bracket and the attachment tabs of the bolting plate. The strap can be configured to extend between a first fluid conduit and a second fluid conduit.

In yet another respect, the present disclosure is directed to a method for providing a protector to a vehicle fluid fill system. The method can include positioning a strap between a first fluid conduit and a second fluid conduit. The method can also include bringing together a protector bracket and a bolting plate to form a channel around the first and second conduits such that the strap divides the channel into a first region and second region.

Variations in these and other aspects, features, elements, implementations, and embodiments of the methods, systems, and apparatuses are disclosed herein are described in further detail hereafter.

DETAILED DESCRIPTION

Figure 1:
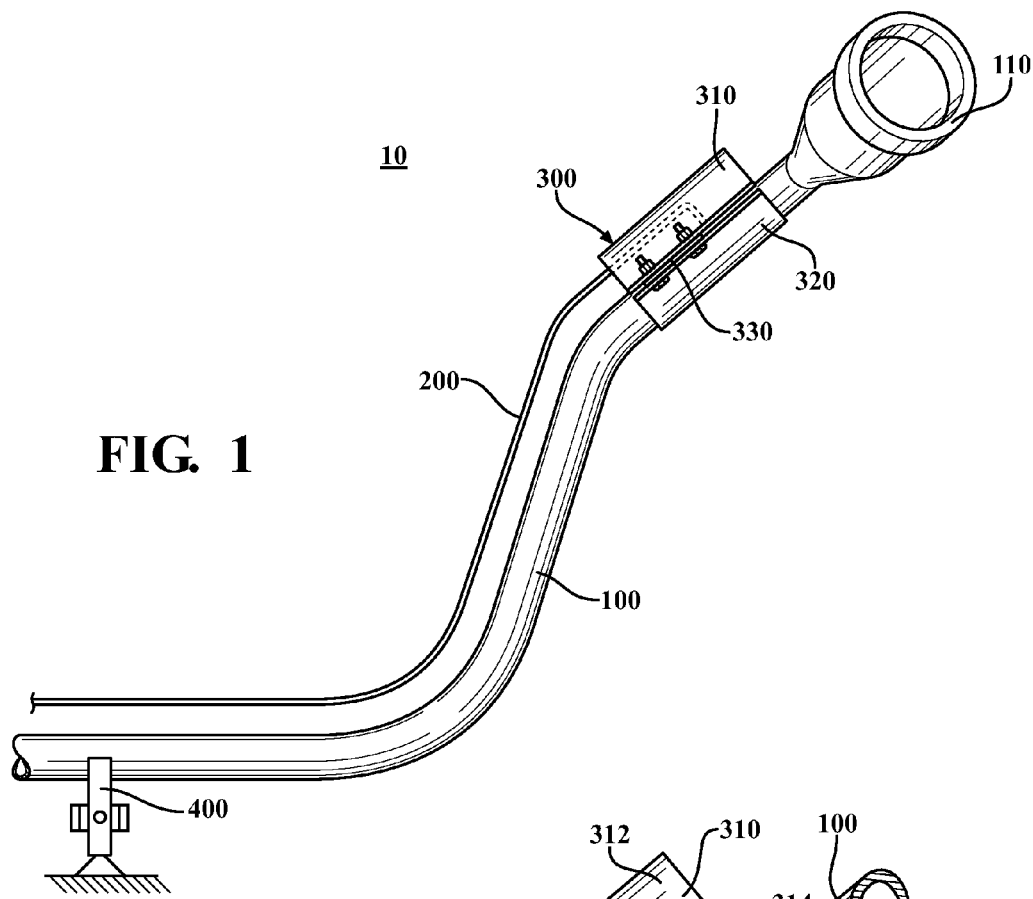
FIG. 1 is a view of an example of a fuel fill system.

Arrangements described herein relate to the protection of fluid conduit systems. In one or more arrangements, a fluid conduit system can be a vehicle system having a first fluid conduit and a second fluid conduit. Such systems can further include a protector configured to protect a portion of both the first and second fluid conduits. The protector can include a strap that is configured to extend between the first fluid conduit and the second fluid conduit. The present detailed description relates to systems, methods, and apparatuses that incorporate such features. In at least some arrangements, the vehicle system can be a fuel fill system having a fuel filler tube, a re-circulation tube, and a protector. In at least some instances, such systems, methods, and apparatuses can increase the ability of the protector to resist deformation in the event of external force application.

Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the Figures, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example of a fluid fill system 10 is shown. Some of the various possible elements of the fluid fill system 10 shown in FIG. 1 will now be described. It will be understood that it is not necessary for the fluid fill system 10 to have all of the elements shown in FIG. 1 or described herein. The fluid fill system 10 can have any combination of the various elements shown in FIG. 1. In one or more arrangements, the system 10 can include one or more elements in addition to one or more of the various elements shown in FIG. 1.

As shown, the fluid fill system 10 can generally include a first fluid conduit, a second fluid conduit, and protector 300. In one or more arrangements, the fluid fill system 10 can be used in connection with a vehicle. As used herein, "vehicle" means any form of motorized transport. In one or more implementations, the vehicle can be an automobile. While arrangements will be described herein with respect to automobiles, it will be understood that embodiments are not limited to automobiles. In some implementations, the vehicle can be a watercraft, an aircraft or any other form of motorized transport. In some implementations, arrangements described herein can be used in connection with non-motorized forms of transport.

In one or more vehicular applications, the first fluid conduit can be a fuel filler tube 100, and the second fluid conduit can be a re-circulation tube 200. As used herein, the terms "conduit" and "tube" can include any structure configured to allow the passage of fluid therethrough. The terms "conduit" and "tube" can be used interchangeably. Components of the system 10 can be operatively connected to each other and/or vehicle structure 400. As used herein, the term "operatively connected" can include direct and indirect connections, including connections without direct physical contact. The term "fuel" can include any fluid useable by a vehicle. For example, fuel can include gasoline, oil, biofuel, hydrogen, ethanol, or any combination thereof.

The fuel filler tube 100 can generally extend from a receiving end 110 to a second end (not shown). The second end can be in fluid communication with a fuel storage tank (not shown). Thus, the fuel filler tube 100 can allow for the transfer of fuel from the receiving end 110 to the storage tank. The receiving end 110 can include portions that are located near and/or accessible from any suitable exterior portion of a vehicle. For example, the receiving end 110 can be located near and/or accessible from a side rear fender of a vehicle. The receiving end 110 can be configured to receive fuel from any suitable fuel dispensing device, such as a conventional gas pump.

The fuel filler tube 100 can be routed, positioned, and/or connected within a vehicle in any suitable manner. For instance, the fuel filler tube 100 can be routed, positioned, and/or connected based on one or more factors, including, for example, safety, design, space, and/or material considerations or constraints. The fuel filler tube 100 can have any suitable cross-sectional shape. In one or more arrangements, the fuel filler tube 100 can have a substantially circular, substantially oval, substantially rectangular, substantially triangular or substantially polygonal cross-sectional shape, or any combination thereof, just to name a few possibilities. Furthermore, the fuel filler tube 100 can be made of any suitable material and can be selected based on the particular application. Non-limiting examples can include metals (e.g. steel or aluminum) and polymers. The fuel filler tube 100 can be made of a rigid material or of a flexible material. In one or more arrangements, the fuel filler tube 100 can be made of steel and can have a substantially oval cross-sectional shape.

As noted above, the fuel fill system 10 can include a re-circulation tube 200. The re-circulation tube 200 can be configured to allow the transfer of fuel vapors between a vehicle fuel storage tank to another portion of the system. For example, the re-circulation tube 200 can extend in fluid communication from a vehicle fuel tank to a portion of the fuel filler tube 100 near the receiving end 110. The re-circulation tube 200 can be operatively connected to fuel filler tube 100 in any suitable manner. In one or more arrangements, the re-circulation tube 200 can extend into or be attached around an aperture defined in the fuel filler tube 100.

The operative connection between the re-circulation tube 200 and the fuel filler tube 100 can be achieved in a variety of ways. For example, a portion of the re-circulation tube 200 can extend substantially parallel to the fuel filler tube 100 before having a bend or elbow re-directing the re-circulation tube 200 toward the fuel filler tube 100 as shown in the Figures. In one or more arrangements, the re-circulation tube 200 can include a bend at an angle of substantially 90 degrees to attach to fuel filler tube 100. As used herein, the term "substantially" includes exactly the term it modifies and slight variations therefrom. Thus, the term "substantially 90 degrees" means exactly 90 degrees and slight variations therefrom. In one or more arrangements, the re-circulation tube 200 can include a bend at an obtuse angle or at an acute angle toward the fuel filler tube 100. The re-circulation tube 200 can be operatively connected to one or more portions of fuel filler tube 100, protector 300, and/or vehicle structure 400.

The re-circulation tube 200 can be shaped, routed, positioned, and/or connected within a vehicle in any suitable manner, such as, for example, based on any combination of safety, design, space, and/or material considerations or constraints. In some embodiments, the re-circulation tube 200 can generally be routed along the same path as the fuel filler tube 100. The re-circulation tube 200 can be routed through different portions of the vehicle. The fuel filler tube 100 can have any suitable cross-sectional shape. For instance, in one or more arrangements, the fuel filler tube 100 can have a substantially circular, substantially oval, substantially rectangular, substantially triangular, substantially polygonal cross-sectional shape, or any combination thereof. Furthermore, the material and thickness of the re-circulation tube 200 can be selected based on the particular application. Non-limiting examples of suitable materials can include metals (e.g. steel or aluminum) and polymers. In one or more arrangements, the re-circulation tube 200 can be made of any suitable steel and can have a substantially oval cross-sectional shape.

Figure 3:
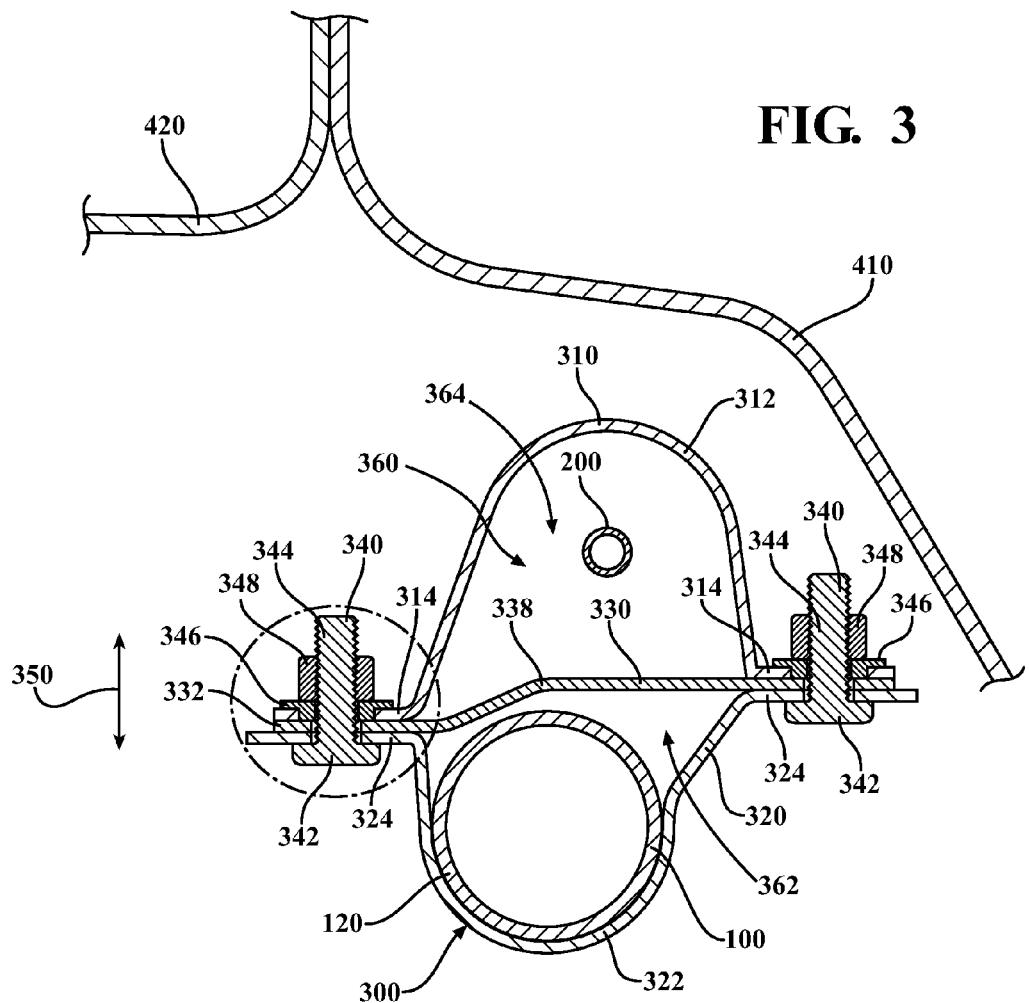
FIG. 3 is a cross-sectional view of an example of the fuel fill system used in connection with a vehicle.

The fuel filler tube 100 and the re-circulation tube 200 can have any suitable relative size with respect to each other. For instance, as is shown in FIG. 3, the fuel filler tube 100 can have an inner diameter that is greater than an inner diameter of the re-circulation tube 200. However, in one or more arrangements, the fuel filler tube 100 can have an inner diameter that is equal to or smaller than an inner diameter of the re-circulation tube 200.

As noted above, the fuel fill system 10 can include one or more protectors 300. The protector 300 can protect, cover, shield, and/or strengthen one or more portions of the fuel fill system 10. The particular size, shape, and configuration of the protector 300 can depend on the size, shape, or position of portions of the fuel filler tube 100 or the re-circulation tube 200 to be protected. Furthermore, characteristics of the protector 300 can be chosen based on the particular portion of the fuel fill system 10 desired to be strengthened or protected. In some embodiments, the protector 300 can be configured to protect at least a portion of the fuel fill system 10 where the re-circulation tube 200 is fluidly connected to the fuel filler tube 100. For example, the protector 300 can extend around both the fuel filler tube 100 and the re-circulation tube 200 at the point the re-circulation tube bends toward and is operatively connected to the fuel filler tube 100. In some embodiments, the protector 300 can be oriented such that the protector 300 is elongated in a direction that is substantially parallel to a longitudinal axis of the fuel filler tube 100 or the longitudinal axis of the re-circulation tube 200.

As further described below, the protector 300 can extend around and substantially cover a portion of the fuel filler tube 100, a portion of the re-circulation tube 200, or both. As used herein, the terms "protector bracket" and "bolting plate" can include any physical structure designed to protect, cover, shield, or add strength to portions of the fuel fill system 10.

In one or more arrangements, the fuel fill system 10 can be located near and/or be operatively connected to vehicle structure 400. The fuel fill system 10 can be operatively connected to vehicle structure 400 in any suitable manner. For instance, the fuel fill system 10 can be operatively connected to the vehicle structure 400 by one or more fasteners, one or more forms of mechanical engagement, one or more adhesives, one or more forms of welding, and/or one or more forms of brazing, just to name a few possibilities. In some embodiments, the fuel fill system 10 can be operatively connected to one or more vehicle body panels near a rear fender. For example, the fuel fill system 10 can be located between an inner body panel 420 and an outer body panel 410 as shown in FIG. 3. The fuel fill system 10 can be connected to one or more panels at the receiving end 110.

Figure 2:
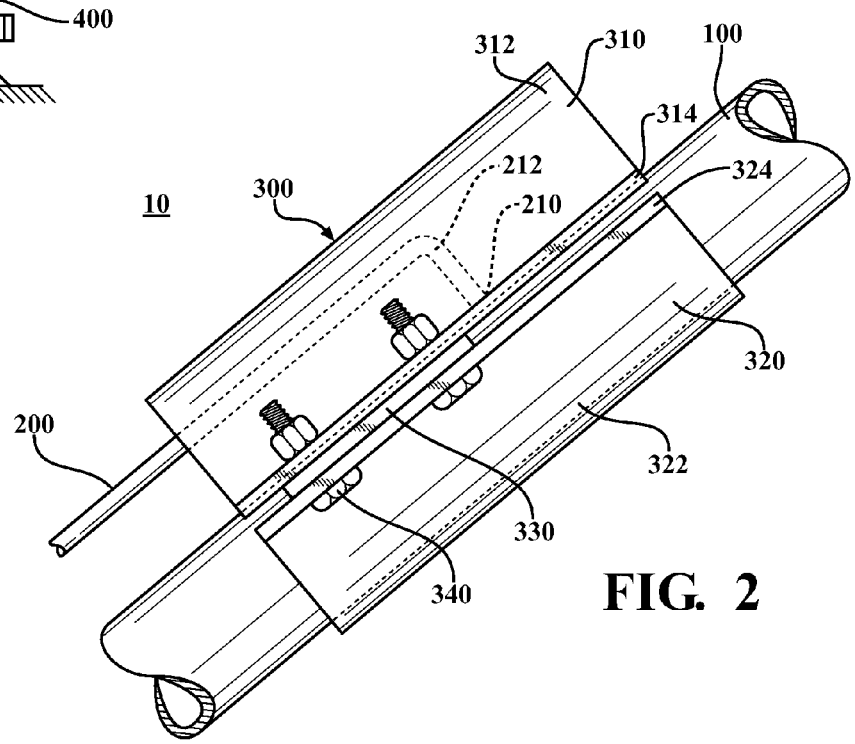
FIG. 2 is a close-up view of a portion of the fuel fill system of FIG. 1, showing an example of a protector.

FIG. 2 is a close-up view of a portion of the fuel fill system 10 of FIG. 1. As mentioned above, the re-circulation tube 200 can include a re-circulation transition 212 between a substantially parallel orientation to a transverse orientation (e.g. a substantially perpendicular orientation) with respect to fuel filler tube 100. Furthermore, the re-circulation tube 200 can be fluidly connected to the fuel filler tube 100 at connection area 210 in any suitable manner. The connection area 210 can include, for example, an aperture defined in the side of the fuel filler tube 100 and a weld joint between the re-circulation tube 200 and the fuel filler tube 100.

As described with greater detail below, arrangements of the protector 300 can include a protector bracket 310, a bolting plate 320, strap 330, or any combination thereof. In some embodiments, the protector bracket 310 can be attached to the bolting plate 320. The protector bracket 310 can be generally opposed to the bolting plate 320. FIGS. 1 and 2 show the protector bracket 310 and the bolting plate 320 overlapping and extending the substantially same distance along a longitudinal direction of the fuel filler tube 100 and the re-circulation tube 200. It is contemplated that other arrangements of the protector 300 include a protector bracket 310 and bolting plate 320 having different sizes and shapes, such as embodiments described in reference to FIGS. 4 and 5.

In some arrangements, the protector 300 can substantially cover both the fuel filler tube 100 and the re-circulation tube 200. As used herein, "substantially cover" as used with the protector 300 can include any arrangements wherein at least a portion of the protector 300 extends substantially around the fuel filler tube 100 and the re-circulation tube 200. For example, the protector bracket 310 together with the bolting plate 320 can form a channel around portions of both the fuel filler tube 100 and the re-circulation tube 200. In some arrangements, the protector bracket 310 and the bolting plate 320 can be continuous in form. It is contemplated, however, that one or both of the protector bracket 310 and the bolting plate 320 can have gaps, voids, cutouts, holes and/or slots in any direction and, for purposes of this disclosure, would still be considered to substantially cover the fuel filler tube 100 and the re-circulation tube 200. For example, the protector bracket 310 can consists of a series of strips extending in the direction of curvature of the protector bracket 310.

As shown in FIG. 2, the protector 300 can include one or more fasteners to operatively connect the protector bracket 310 and the bolting plate 320. In some non-limiting examples, the fastener can be a bolt 340, pin, screw, rod or other element that extends through apertures defined in the protector bracket 310 and the bolting plate 320.

Figure 4:
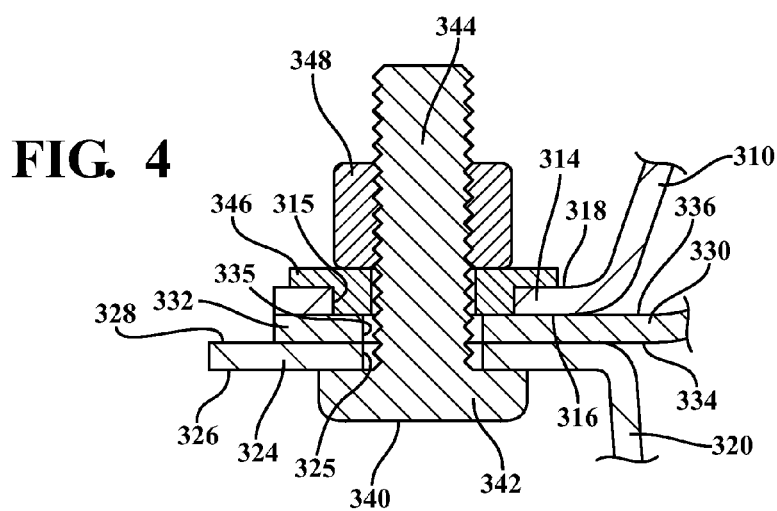
FIG. 4 is a close-up cross-sectional view of at least a portion of the fuel fill system, showing an example of an operative connection between components of the protector.

In some embodiments, the strap 330 can be provided between the protector bracket 310 and the bolting plate 320. As used herein, the term "strap" can mean any structure that extends between two or more attachment points of the protector 300. The strap 330 can be a substantially rigid structure, or the strap 330 can be a non-rigid or flexible structure. The strap 330 can be operatively connected to one or both of the protector bracket 310 and the bolting plate 320 in any suitable manner. For example, the strap 330 can be operatively connected to the protector bracket 310 and/or the bolting plate 320 using one or more fasteners, one or more forms of mechanical engagements, one or more adhesives, and/or one or more welds, just to name a few possibilities. For example, the strap 330 can have one or more apertures 335 (FIG. 4). The one or more apertures 335 can be configured to receive a respective bolt 340 that also extend through substantially aligned apertures 315, 325 in the protector bracket 310 and the bolting plate 320, respectively.

As explained below, the strap 330 can be configured to resist certain deformations in the protector bracket 310 or the bolting plate 320. For example, the strap 330 can prevent portions of either the protector bracket 310 or the bolting plate 320 from deforming or moving outward and away from each other when the protector 300 is subjected to one or more forces, loads, and/or impacts. In one or more arrangements, the strap 330 can resist relative movement of opposing attachment tabs 314/324 of the protector bracket 310 and the bolting plate 320, respectively.

The strap 330 can be made of a variety of suitable materials. For example, the strap 330 can be made of any suitable metal, polymer, fabric, or any combination thereof. In one or more arrangements, the strap 330 can be made of any suitable steel. Furthermore, the strap 330 can be substantially rigid or, alternative, be flexible. Similarly, the size, shape, and/or orientation of the strap 330 can be determined based on the particular application. In some examples, the strap 330 can be shaped to avoid contacting the fuel filler tube 100. In some arrangements, the strap 330 can have any suitable dimensions. In one or more arrangements, the strap 330 can be can from about 2 millimeters to about 3 millimeters thick. In one or more arrangements, the thickness of the strap 330 can be substantially constant. In one or more arrangements, the thickness of the strap 330 can vary in one or more locations, or the thickness of the strap 330 can continuously vary across the entire strap 330 in one or more directions.

FIG. 3 is a cross-sectional view of one embodiment of the fuel fill system within a vehicle. As shown, the protector 300 can be operatively connected to the fuel filler tube 100 or to the re-circulation tube 200 proximate to an inner body panel 420 and an outer body panel 410. Some arrangements of the protector 300 will be explained in further detail with reference to FIGS. 2-5.

The protector bracket 310 can include a main portion 312 and one or more attachment tabs 314. In one or more arrangements, the attachment tabs 314 can extend substantially laterally from the main portion 312. In some embodiments, the main portion 312 extends between substantially opposing attachment tabs 314. The main portion 312 can be shaped as desired to substantially cover a portion of either the fuel filler tube 100 or the re-circulation tube 200. For example, the main portion 312 can be curved such that it forms an arch around the re-circulation tube 200. The main portion 312 can contact or be attached to one or both of the fuel filler tube 100 or the re-circulation tube 200, or can be spaced apart from such structures as shown in FIG. 3.

The protector bracket 310 can have any suitable size, shape and/or configuration. The protector bracket 310 can be positioned and/or connected within the protector 300 in any suitable manner. For instance, the protector bracket 310 can be positioned and/or connected within the protector 300 based on one or more factors, including, for example, safety, design, space, and/or material considerations or constraints. The protector bracket 310 can be made of any suitable material. For instance, the protector bracket 310 can be made of one or more metals or polymers. In one or more arrangements, the protector bracket 310 can have a substantially uniform thickness. In one or more arrangements, the protector bracket 310 can have a non-uniform thickness. For instance, the thickness of the protector bracket 310 can vary in one or more local areas or continuously in one or more directions (e.g. length and/or width). In one or more arrangements, the protector bracket 310 can be of any suitable steel and can be from about 1 millimeter to about 2 millimeters thick. Additionally, the protector bracket 310 can have any suitable cross-sectional shape. In one or more arrangements, the protector bracket 310 can have a constant cross-sectional shape. In one or more arrangements, the protector bracket 310 can have a varying cross-sectional shape along protector 300. For example, the main portion 312 of the protector bracket 310 can include thicker portions or structural elements (e.g. ribs) to increase the strength of the protector bracket 310. The thicker portions or structural elements can be spaced longitudinally.

The bolting plate 320 can include a main portion 322 and one or more attachment tabs 324. In one or more arrangements, the attachment tabs 324 can extend substantially laterally from the main portion 322. In some embodiments, the main portion 322 can extend between substantially opposing attachment tabs 324. While the term "plate" can connote a flat or planar structure, the term as used herein is not so limited. Indeed, the term "plate" can include non-planar and/or non-flat structures as well. In one or more arrangements, the main portion 322 can be configured to cover a portion of the fuel filler tube 100 or the re-circulation tube 200. In one or more arrangements, the main portion 322 can be curved or bowed such that it forms an arch. The main portion 322 can contact or be attached to one or both of fuel filler tube 100 or re-circulation tube 200, or can be spaced apart from such structure. For example, the main portion 322 of bolting plate 320 can have substantially the same contour and be attached to a portion of the fuel filler tube 100 at an attachment 120 via welding.

The bolting plate 320 can have any suitable size, shape and/or configuration. The bolting plate 320 can be positioned and/or connected within the protector 300 in any suitable manner. For instance, the bolting plate 320 can be positioned and/or connected within the protector 300 based on one or more factors, including, for example, safety, design, space, and/or material considerations or constraints. The bolting plate 320 can be made of any suitable material. For instance, the bolting plate 320 can be made of one or more metals or polymers. In one or more arrangements, the bolting plate 320 can have a substantially uniform thickness. In one or more arrangements, the bolting plate 320 can have a non-uniform thickness. For instance, the thickness of the bolting plate 320 can vary in one or more local areas or continuously in one or more directions (e.g. length and/or width). In one or more arrangements, the bolting plate 320 can be of any suitable steel and can be from about 1 millimeter to about 2 millimeters thick. Additionally, the bolting plate 320 can have any suitable cross-sectional shape. In one or more arrangements, the bolting plate 320 can have a substantially constant cross-sectional shape. In one or more arrangements, the cross-sectional shape of the bolting plate 320 can vary along protector 300.

The strap 330 can be positioned between the protector bracket 310 and the bolting plate 320 and extend between the two or more attachment tabs 332 as shown. In one or more arrangements, the strap 330 is provided such that it extends through an area located between the fuel filler tube 100 and the re-circulation tube 200. For example, the attachment tabs 332 of the strap 330 can be located between the attachment tabs 314, 324 of the protector bracket 310 and the bolting plate 320, respectively. The strap 330 can extend between the main portions 312, 322 of the protector bracket 310 and the bolting plate 320, respectively. Thus, the strap 330 can divide the channel defined by the protector bracket 310 and the bolting plate 320 into two or more regions. In some embodiments, a first region can be defined as the area between the strap 330 and the bolting plate 320. In some examples, fuel filler tube 100 can at extend through the first region. In some embodiments, a second region can be defined as the area between the strap 330 and the protector bracket 310. In some examples, the re-circulation tube 200 can at extend through the second region.

As mentioned, the strap 330 can be shaped as desired for the protector 300. In one or more arrangements, the strap 330 can be a substantially flat or substantially planar structure. In one or more arrangements, the strap 330 can include one or more non-flat or non-planar features. As an example, the strap 330 can include a strap transition 338 between the attachment tabs 332. In one or more arrangements, the strap transition 338 can provide clearance around the fuel filler tube 100 and/or the re-circulation tube 200. Furthermore, the strap transition 338 can allow the strap 330 to provide attachment tabs 332 that are offset from one another in at least one direction. The strap transition 338 can have any suitable configuration to achieve a desired shape for the strap 330. For example, the strap transition 338 can include one or more bends, steps, ramps and/or curves. In one or more arrangements, the attachment tabs 332 of the strap 330 can be substantially parallel to each other. In one or more arrangements, the attachment tabs 332 of the strap 330 can be in substantially the same plane as each other. In one or more arrangements, the attachment tabs 332 can be offset from each other in one or more directions. FIG. 3 shows an example in which the attachment tabs 332 are offset from each other in a first direction 350. The offset can be defined by any suitable distance.

The attachment of one or more components of the protector 300 can be described with reference to FIGS. 3 and 4. The attachment tab 314 of the protector bracket 310 can have an inner surface 316 and an outer surface 318. Here, the terms "inner" and "outer" are used with respect to the strap 330. Thus, the inner surface 316 is located closer to the strap 330 than the outer surface 318. The attachment tab 324 of the bolting plate 320 can have an outer surface 326 and an inner surface 328. The strap 330 can have a first surface 334 and a second surface 336. As shown in FIG. 4, the inner surface 316 of the protector bracket 310 can be substantially adjacent to, directly contact and/or otherwise face the second surface 336. The inner surface 328 of the bolting plate 320 can be substantially adjacent to, directly contact and/or otherwise face the first surface 334.

In some arrangements, the attachment tabs 314, 324, 332 can be substantially parallel to each other near a fastening location. This can include examples where all the attachment tabs 314, 324, 332 are substantially parallel to each other, such as the left and right set of attachment tabs in FIG. 3. Furthermore, one set of attachment tabs 314, 324, 332 can be substantially parallel to each other at one fastening location but can be oriented at an angle to a second set of attachment tabs 314, 324, 332 at another fastening location. In such examples, the surfaces of the protector bracket 310, the bolting plate 320, and the strap 330 can be substantially parallel to each other at the attachment tabs 314, 324, 332.

The bolt 340 can be provided to secure the protector bracket 310, the bolting plate 320, and the strap 330. For example, the bolt 340 can have a head 342 and a shaft 344. The shaft 344 can be configured to extend into apertures 315, 325, 335 defined in one or more of the protector bracket 310, the bolting plate 320, and/or the strap 330, respectively. A locking washer 346 and/or a nut 348 can be provided to secure and/or retain the bolt 340 in place. In one or more arrangements, the bolt 340 can be provided with the bolting plate 320. As an example, the bolt 340 can be press-fit into an aperture 325 of the attachment tab 324 of the bolting plate 320 or otherwise integrated with the bolting plate 320. In some embodiments, two or more bolts 340 can extend in substantially parallel directions. For example, if two or more sets of attachment tabs 314, 324, 332 are parallel to each other, two or more bolts can extend substantially perpendicular to tab surfaces and thus extend parallel to each other.

Figure 5:
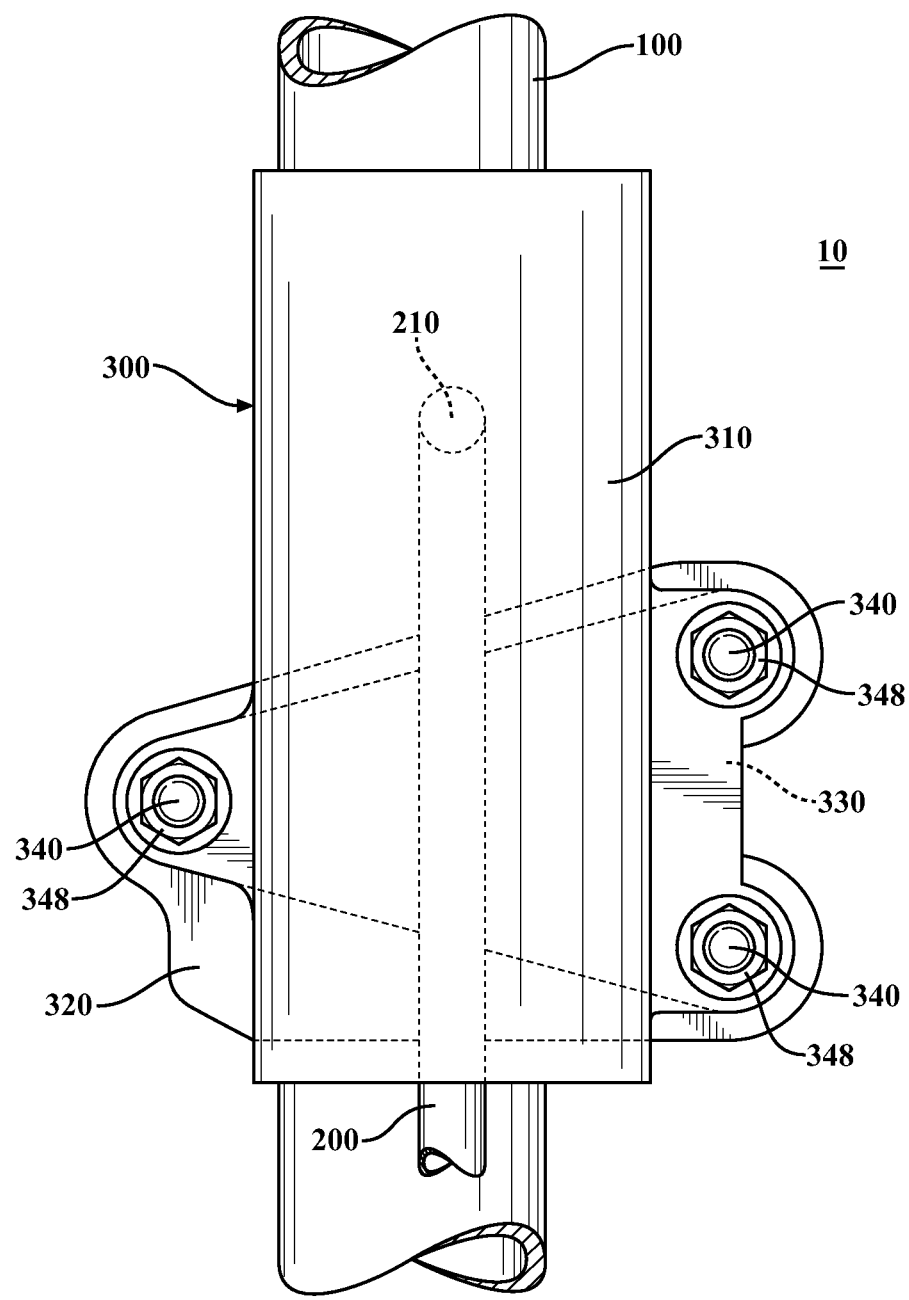
FIG. 5 is a view of a portion of a fuel fill system, showing an example of an alternative protector configuration.

FIG. 5 is a view of a portion of a fuel fill system 10. In one or more arrangements, the protector bracket 310 and the bolting plate 320 can be configured and/or arranged such that they do not fully overlap each other. For example, the protector bracket 310 can be elongated and can extend farther than the bolting plate 320 and/or the strap 330 in a direction following the re-circulation tube 200 or the fuel filler tube 100. In one or more arrangements, the protector bracket 310 can extend a distance in a longitudinal direction to cover the connection area 210 between the re-circulation tube 200 and the fuel filler tube 100. Furthermore, the bolting plate 320 can extend farther in a radial direction than the protector bracket 310 and the strap 330. For example, attachment tabs 324 of bolting plate 320 can extend beyond other structure, as shown in FIGS. 3-5. In some examples, the strap 330 can extend in a longitudinal direction but terminate before reaching the connection area 210 between the fuel filler tube 100 and the re-circulation tube 200.

In some embodiments, the protector 300 can include three fasteners, as generally shown in FIG. 5. However, it will be understood that any suitable number of fasteners can be included. In the example of three fasteners, two of the fasteners can be oriented on one side of the fuel fill system 10, and one of the fasteners can be oriented on an opposing side of the fuel fill system 10. In other arrangements, the protector 300 can have two, four, or six fasteners.

The strap 330 can be engaged by alone or more of the fasteners. In the arrangement illustrated in FIG. 5, the strap 330 can be generally triangular and can be engaged by three fasteners. In other examples, the strap 330 can be attached via two fasteners and can extend between attachment points in a generally rectangular shape.

Figure 6A:
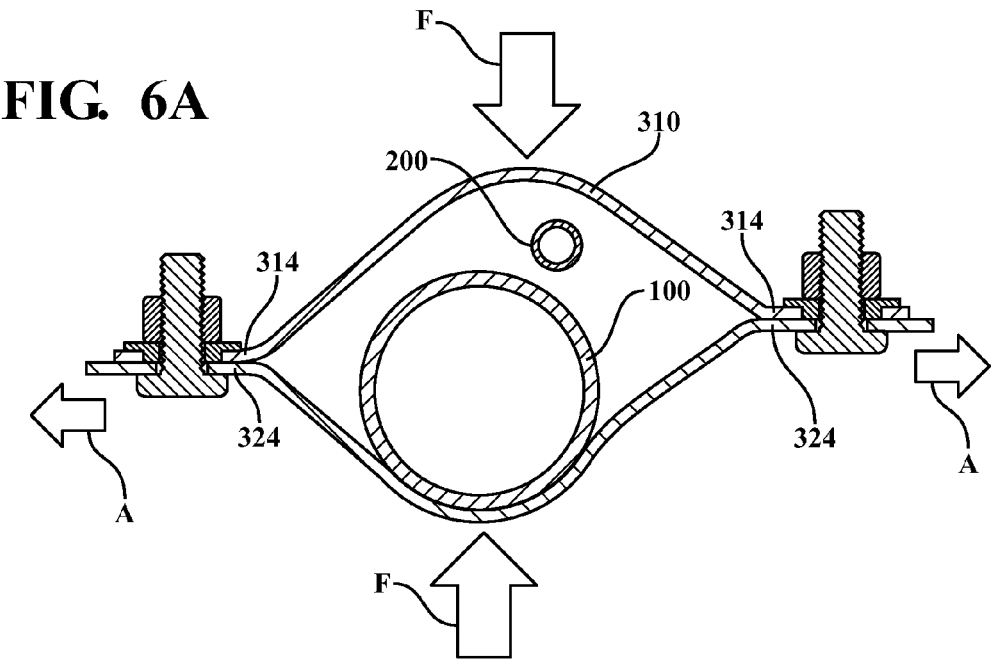
FIG. 6A is a cross-sectional view of a portion of a fuel fill system, showing a protector that does not include a strap.
Figure 6B:
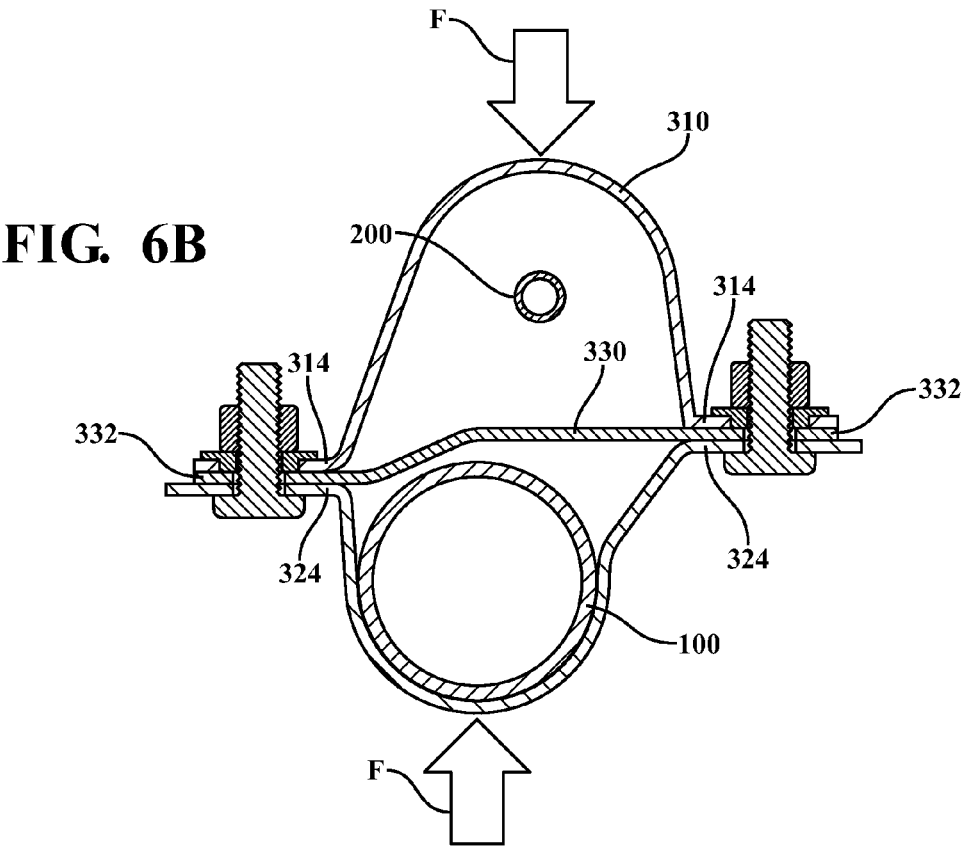
FIG. 6B is a cross-sectional view of a portion of a fuel fill system, showing a protector that includes a strap.

FIGS. 6A and 6B are cross-sectional views of fuel fill systems 10 having a protector 300 without and with a strap 330, respectively. As shown, the fuel fill system 10 can be subjected to one or more forces F or load, which can be, for example, compressive forces or loads. As illustrated in FIG. 6A, one or more forces F can cause the connection areas between the protector bracket 310 and the bolting plate 320 to displace away from each other in the direction of arrows A. As a result, the main portions 312, 322 of the protector bracket 310 and/or the bolting plate 320 can be moved toward each other and/or into contact with the fuel filler tube 100 and/or the re-circulation tube 200. Such contact can lead to fracture, bending, breaking, or other failures of the fuel filler tube 100, the re-circulation tube 200, and/or the connection area 210 between the two.

FIG. 6B shows a similar application of forces F to a protector 300 having strap 330. The strap 330 can be subject to a tensile load and resist or prevent the migration or deformation of the attachment portions of the protector bracket 310 or bolting plate 320. In some arrangements, this can change failure characteristics of protector 300 during such forces. For example, the strap 330 can resist relative movement between attachment tabs 314, 324, 332. As a result, the main portions 312 or 322 can effectively be caused to buckle and/or deform for the protector 300 to fail.

A protector can be provided with a fluid or fuel fill assembly in any suitable manner. For example, a strap can be positioned between a first a first fluid conduit and a second fluid conduit. In some arrangements, the strap 330 can be positioned between the fuel filler tube 100 and the re-circulation tube 200. A protector bracket and bolting plate can be brought together to form a channel around the first and second conduits. In doing so, the strap 330 can divide the channel into two or more regions. As used herein, the term "bringing together" or "brought together" means any movement, positioning and/or manipulation of one or more components of the protector 300. For example, the protector bracket 310 and the bolting plate 320 can be operatively connected in any suitable manner. For instance, the protector bracket 310 and the bolting plate can be operatively connected by one or more fasteners and/or one or more forms of mechanical engagement. Alternatively or in addition, the bolting plate 320 and the fuel filler tube 100 can be operatively connected by adhesives, welding and/or brazing. The operative connection between the protector bracket 310 and the bolting plate 320 can also operatively connect these structure to the strap 330.

Methods can include other steps that are not shown here, and in fact, methods are not limited to including every step described. Furthermore, the steps detailed here as part of the method for providing a protector are not limited to this particular chronological order. Indeed, some of the steps can be performed in a different order than what is described and/or at least some of the steps can occur simultaneously.

It will be appreciated that arrangements described herein can provide numerous benefits, including one or more of the benefits mentioned herein. For example, arrangements described herein can increase the strength and/or rigidity of protectors positioned around one or more fluid conduits. The protectors can shield and/or protect fluid conduit components and/or the connections between them. For example, the protectors can cover a portion of two fluid conduits and a fluid connection between the two. Further, such arrangements can require greater forces to deform the protector and/or fluid conduits. For instance, a strap can provide tension force between fasteners of the protector, thus changing the deformation characteristics of the protector under loads. The strap can provide a tension force to prevent or resist the relative movement of fastening locations within the protector during deformation.

As used herein, the terminology "example", "embodiment", "implementation", "aspect", "feature", or "element" indicate serving as an example, instance, or illustration. Unless expressly indicated, any example, embodiment, implementation, aspect, feature, or element is independent of each other example, embodiment, implementation, aspect, feature, or element and can be used in combination with any other example, embodiment, implementation, aspect, feature, or element.

As used herein, the terminology "or" is intended to mean an inclusive "or" rather than an exclusive "or". That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein can include sequences or series of steps or stages, elements of the methods disclosed herein can occur in various orders or concurrently. Additionally, elements of the methods disclosed herein can occur with other elements not explicitly presented and described herein. Furthermore, not all elements of the methods described herein can be required to implement a method in accordance with this disclosure. Although aspects, features, and elements are described herein in particular combinations, each aspect, feature, or element can be used independently or in various combinations with or without other aspects, features, and elements.

Although features can be described above or claimed as acting in certain combinations, one or more features of a combination can in some cases be excised from the combination, and the combination can be directed to a subcombination or variation of a sub-combination.

The above-described aspects, examples, and implementations have been described in order to allow easy understanding of the application are not limiting. On the contrary, the application covers various modifications and equivalent arrangements included within the scope of the appended claims, which scope is to be accorded the broadest interpretation so as to encompass all such modifications and equivalent structure as is permitted under the law.

What is claimed is:

1. A vehicle fuel fill system, comprising:
    a fuel filler tube configured to allow transfer of fuel into a vehicle fuel storage tank;
    a re-circulation tube in fluid communication with the fuel filler tube; and
    a protector, comprising:
        a protector bracket having a plurality of attachment tabs;
        a bolting plate having a plurality of attachment tabs; and
        a strap having a plurality of attachment tabs, the attachment tabs positioned between, and directly attached to, the attachment tabs of the protector bracket and the attachment tabs of the bolting plate, the strap being configured to extend between the fuel filler tube and the re-circulation tube.

2. The fuel fill system of claim 1, wherein the protector substantially covers both the fuel filler tube and the re-circulation tube near a connection between the re-circulation tube and the fuel filler tube.

3. The fuel fill system of claim 2, wherein the protector bracket and bolting plate form a channel around a portion of the fuel filler tube and re-circulation tube.

4. The fuel fill system of claim 3, wherein the strap divides the channel into a first region and a second region, the first region being between the strap and the protector bracket and the second region being between the strap and the bolting plate.

5. The fuel fill system of claim 3, wherein the protector bracket extends in a longitudinal direction to cover the connection between the re-circulation tube and fuel filler tube.

6. The fuel fill system of claim 5, wherein the strap extends in the longitudinal direction and terminates prior to the connection between the re-circulation tube and the fuel filler tube.

7. The fuel fill system of claim 1, wherein two or more attachment tabs of the strap are substantially parallel and offset from each other, the strap further comprising a strap transition extending between the two or more offset attachment tabs.

8. The fuel fill system of claim 1, wherein the protector further comprising a plurality of fasteners that extend through apertures defined in the attachment tabs of the protector bracket, the attachment tabs of the bolting plate, and the attachment tabs of the strap.

9. A vehicle fuel fill system, comprising:
    a fuel filler tube configured to allow transfer of fuel into a vehicle fuel storage tank;
    a re-circulation tube in fluid communication with the fuel filler tube; and
    a protector, comprising:
        a protector bracket having a plurality of attachment tabs;
        a bolting plate having a plurality of attachment tabs; and
    a strap having a plurality of attachment tabs, the attachment tabs positioned between the attachment tabs of the protector bracket and the attachment tabs of the bolting plate, the strap being configured to extend between the fuel filler tube and the re-circulation tube,
        wherein the protector has three fasteners extending in substantially parallel directions, and the strap extends in a generally triangular shape between each of the three fasteners.

10. A protector for a vehicle fluid conduit system, the protector comprising:
    a protector bracket having a plurality of attachment tabs;
    a bolting plate having a plurality of attachment tabs; and
    a strap having a plurality of attachment tabs, the attachment tabs positioned between the attachment tabs of the protector bracket and the attachment tabs of the bolting plate,
        wherein the protector bracket and bolting plate are configured to form a cavity substantially all the way around a portion of a first fluid conduit and a second fluid conduit, and the strap is configured to extend between the first fluid conduit and the second fluid conduit within the cavity.

11. The protector of claim 10, wherein the strap divides the cavity into a first region and a second region, the first region being between the strap and the protector bracket and the second region being between the strap and the bolting plate.

12. The protector of claim 11, wherein the first fluid conduit is a fuel filler tube and the second fluid conduit is a re-circulation tube.

13. The protector of claim 12, wherein the protector bracket extends in a longitudinal direction to substantially cover a connection between the re-circulation tube and fuel filler tube.

14. The protector of claim 13, wherein the strap extends in the longitudinal direction and terminates prior to the connection between the re-circulation tube and the fuel filler tube.

15. The protector of claim 10, wherein two or more attachment tabs of the strap are substantially parallel and offset from each other, the strap further comprising a strap transition extending between the two or more offset attachment tabs.

16. A method for providing a protector to a vehicle fluid fill system, comprising:
 positioning a strap between a first fluid conduit and a second fluid conduit;
 bringing together a protector bracket and a bolting plate to form a channel around the first and second conduits such that the strap divides the channel into a first and second region; and
 operatively connecting the protector bracket, the bolting plate, and the strap such that attachment tabs of the protector bracket, the bolting plate, and the strap are directed attached to one another.

17. The method of claim 16, wherein operatively connecting the protector bracket, the bolting plate and the strap includes operatively connecting the protector bracket, the bolting plate and the strap by one or more fasteners.

18. The method of claim 16, wherein the first fluid conduit extends at least partially through the first region and the second fluid conduit extends at least partially through the second region.

* * * * *